(12) United States Patent
Dover

(10) Patent No.: US 9,186,021 B1
(45) Date of Patent: Nov. 17, 2015

(54) TORTILLA MOLDING DEVICE

(71) Applicant: Nancy A. Dover, San Pedro, CA (US)

(72) Inventor: Nancy A. Dover, San Pedro, CA (US)

( * ) Notice: Subject to any disclaimer, the term of this patent is extended or adjusted under 35 U.S.C. 154(b) by 290 days.

(21) Appl. No.: 13/765,165

(22) Filed: Feb. 12, 2013

(51) Int. Cl.
| A47J 43/18 | (2006.01) |
| A22C 7/00 | (2006.01) |
| A23P 1/00 | (2006.01) |
| A23L 1/236 | (2006.01) |
| A21D 13/00 | (2006.01) |
| A47J 37/12 | (2006.01) |

(52) U.S. Cl.
CPC .................................... *A47J 37/1295* (2013.01)

(58) Field of Classification Search
CPC ............ A21D 13/0074; A21D 13/0096; A47J 37/1295; A47J 43/18; A47J 36/2405; A47J 36/24; A47J 37/1214; A47J 27/004; A47J 43/20; A21B 5/08; A47G 2019/306
USPC ........... 99/426, 391, 385, 393, 448, 353, 403, 99/428, 449, 450, 404, 427, 443; 426/549, 426/560, 550, 558, 390, 391, 516, 517, 496, 426/505, 512; 219/521, 401, 386, 432, 433, 219/441
See application file for complete search history.

(56) References Cited

U.S. PATENT DOCUMENTS

| 2,957,404 | A | * | 10/1960 | Richardson | 99/426 |
| 3,020,826 | A | * | 2/1962 | Silva | 99/426 |
| 3,585,922 | A | * | 6/1971 | Peterson et al. | 99/355 |
| 3,693,537 | A | * | 9/1972 | Johnson et al. | 99/426 |
| 3,759,165 | A | * | 9/1973 | Wallace | 99/427 |
| 3,817,163 | A | * | 6/1974 | Kizziar et al. | 99/353 |
| 3,861,289 | A | * | 1/1975 | Baker et al. | 99/404 |
| 4,013,869 | A | * | 3/1977 | Orts | 219/401 |
| D249,219 | S | * | 9/1978 | Stence | D7/672 |
| 4,154,153 | A | * | 5/1979 | Stickle | 99/404 |
| 4,154,156 | A | * | 5/1979 | Brignall | 99/426 |
| 4,173,926 | A | * | 11/1979 | Brignall | 99/349 |
| 4,517,887 | A | * | 5/1985 | Childress | 99/426 |
| 4,535,688 | A | * | 8/1985 | Bentson | 99/353 |
| 4,782,745 | A | * | 11/1988 | George, Jr. | 99/483 |
| 5,309,826 | A | * | 5/1994 | Ortiz | 99/391 |
| 7,281,469 | B1 | * | 10/2007 | Barbour et al. | 99/426 |
| 2006/0117963 | A1 | * | 6/2006 | Schneider et al. | 99/403 |
| 2007/0163449 | A1 | * | 7/2007 | Hart | 99/426 |
| 2008/0014324 | A1 | * | 1/2008 | Darnell | 426/549 |
| 2008/0028950 | A1 | * | 2/2008 | Vasquez | 99/426 |

* cited by examiner

*Primary Examiner* — Dana Ross
*Assistant Examiner* — Gyounghyun Bae

(57) ABSTRACT

A tortilla molding device holds a tortilla in a desired shape during frying in a shallow depth of oil. The device includes a frame having a pair of lateral sides and a base coupled to and extending between the lateral sides. A plurality of holders is coupled to the frame. Each of the holders has a first end coupled to the frame and a medial portion positioned in spaced relationship to the lateral sides of the frame. Thus, the holders are configured to hold a tortilla in a partially opened folded position adjacent to the frame permitting hands free frying of the tortilla in a pan of oil.

17 Claims, 3 Drawing Sheets

TORTILLA MOLDING DEVICE

BACKGROUND OF THE DISCLOSURE

Field of the Disclosure

The disclosure relates to food molding devices and more particularly pertains to a new food molding device for holding a tortilla in a desired shape during frying in a shallow depth of oil.

SUMMARY OF THE DISCLOSURE

An embodiment of the disclosure meets the needs presented above by generally comprising a frame having a pair of lateral sides and a base coupled to and extending between the lateral sides. A plurality of holders is coupled to the frame. Each of the holders has a first end coupled to the frame and a medial portion positioned in spaced relationship to the lateral sides of the frame. Thus, the holders are configured to hold a tortilla in a partially opened folded position adjacent to the frame permitting hands free frying of the tortilla in a pan of oil.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
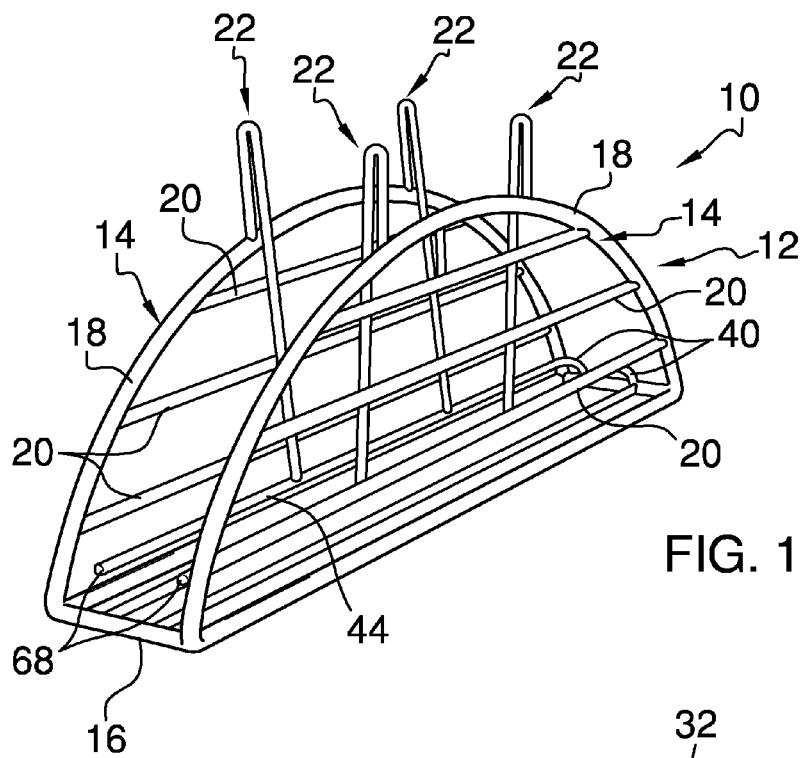
FIG. 1 is a top front side perspective view of a tortilla molding device according to an embodiment of the disclosure.

With reference now to the drawings, and in particular to FIGS. 1 through 6 thereof, a new food molding device embodying the principles and concepts of an embodiment of the disclosure and generally designated by the reference numeral 10 will be described.

As best illustrated in FIGS. 1 through 6, the tortilla molding device 10 generally comprises a frame 12 having a pair of lateral sides 14 and a base 16 coupled to and extending between the lateral sides 14. Each lateral side 14 may have an elongated arcuate member 18 and a plurality of cross-members 20 having opposite ends coupled to said arcuate member 18. A plurality of holders 22 are coupled to the frame 12. Each of the holders 22 has a first end coupled to the frame 12. A medial portion 24 of each holder 22 is positioned in spaced relationship to the lateral sides 14 of the frame 12 wherein the holders 22 are configured to hold and support a tortilla in a partially opened folded position adjacent to the frame 12 forming what is commonly known as a taco shell. The frame 12 and holders 22 permit hands free frying of the tortilla in a pan of shallow oil as opposed to deep frying. Each of the holders 22 extends from an edge 26 of an associated one of the lateral sides 14 of the frame 12 formed by the arcuate member 18. Each of the holders 22 may have a first straight section 28, a second straight section 30 and a medial section 32 extending between the first straight section 28 and the second straight section 30. The first straight section 28 of each holder 22 may be coplanar with the associated lateral side 14 of the frame 12 from which the holder 24 extends. The medial section 32 of each holder 24 may be arcuate in shape. The second straight section 30 of each holder 24 is positioned in substantially parallel spaced relationship to the first straight section 28 of the holder 24 to support the tortilla forming a substantially planar side for the taco shell.

Figure 2:
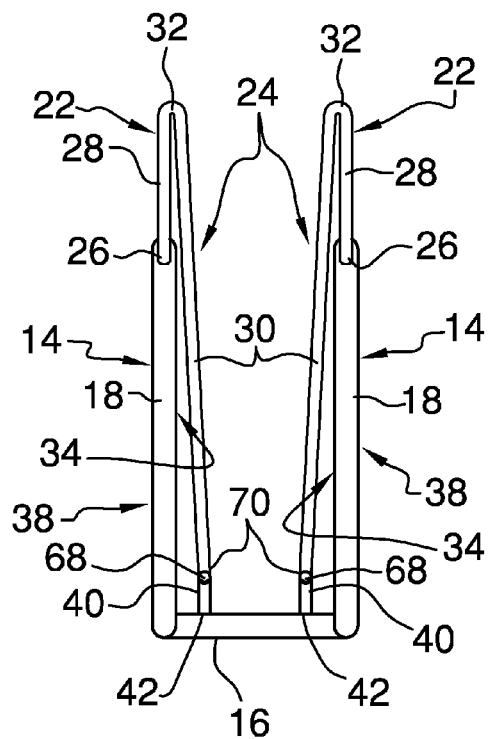
FIG. 2 is a front view of an embodiment of the disclosure.
Figure 3:
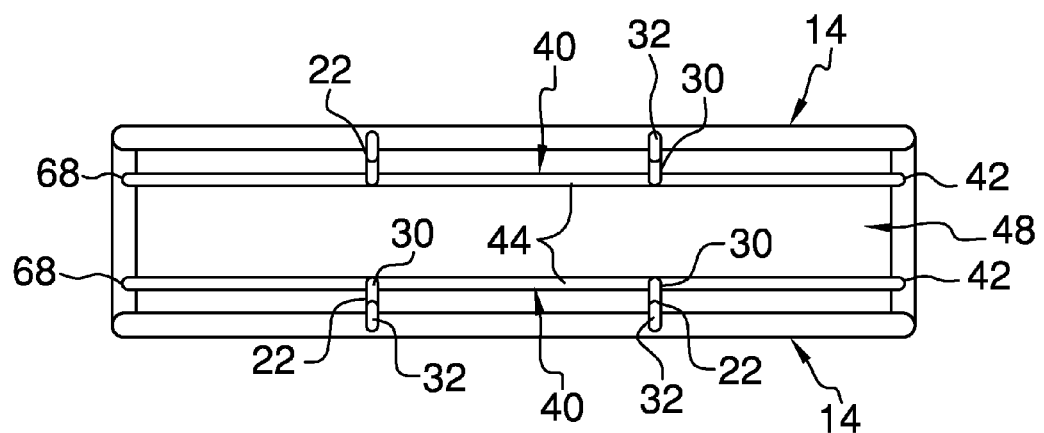
FIG. 3 is a top view of an embodiment of the disclosure.
Figure 4:
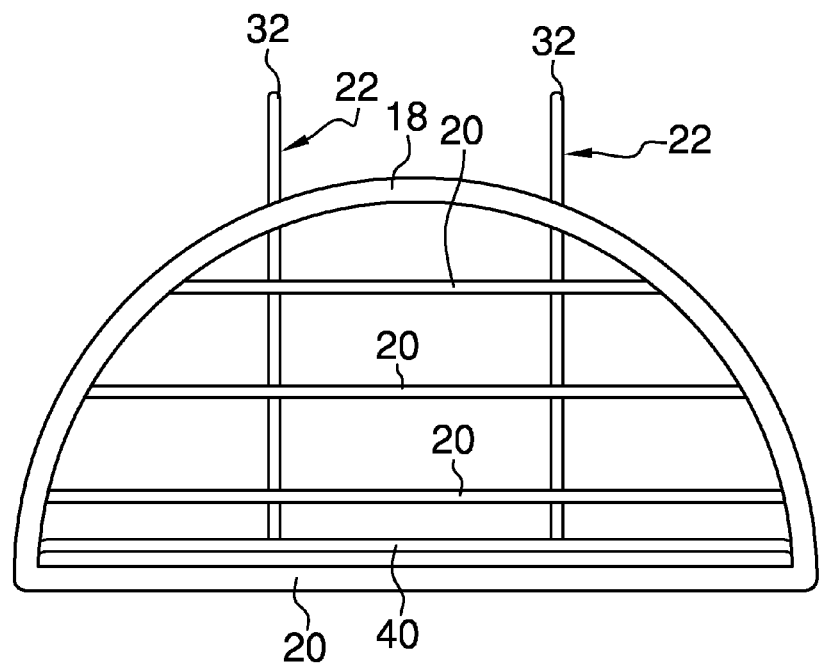
FIG. 4 is a side view of an embodiment of the disclosure.

The second straight section 30 of each holder 24 may be positioned in spaced relationship to an interior face 34 of the associated lateral side 14 of the frame 12 as shown in FIGS. 1 and 2. Alternatively, the second straight section 30 of each holder 24 may be positioned in spaced relationship to an exterior face 38 of the associated lateral side 14 of the frame 12 as shown in FIG. 6.

The base 16 may be planar as shown in FIGS. 1 through 4. In this configuration a pair of parallel spaced bars 40 may be coupled to the base 16. Each of the bars 40 has a fixed end 42 coupled to the base 16 and a free end 68 and a middle section 44 extending between the fixed end 42 of the bar 40 and the free end 68 in substantially parallel spaced relationship to the base 16. Bottom ends 70 of the holders 22 may each be coupled to the bars 40.

In an embodiment, the plurality of holders 24 may include both a plurality of interior holders 50 and a plurality of exterior holders 52. The second straight section 30 of each interior holder 50 is positioned in spaced relationship to the interior face 34 of the associated lateral side 14 of the frame 12 while the second straight section 30 of each exterior holder 52 is positioned in spaced relationship to the exterior face 38 of the associated lateral side 14 of the frame 12 as shown in FIG. 6. This configuration permits frying of two tortillas simultaneously if so desired. This configuration may be utilized with the planar base configuration shown in FIG. 1.

Figure 5:
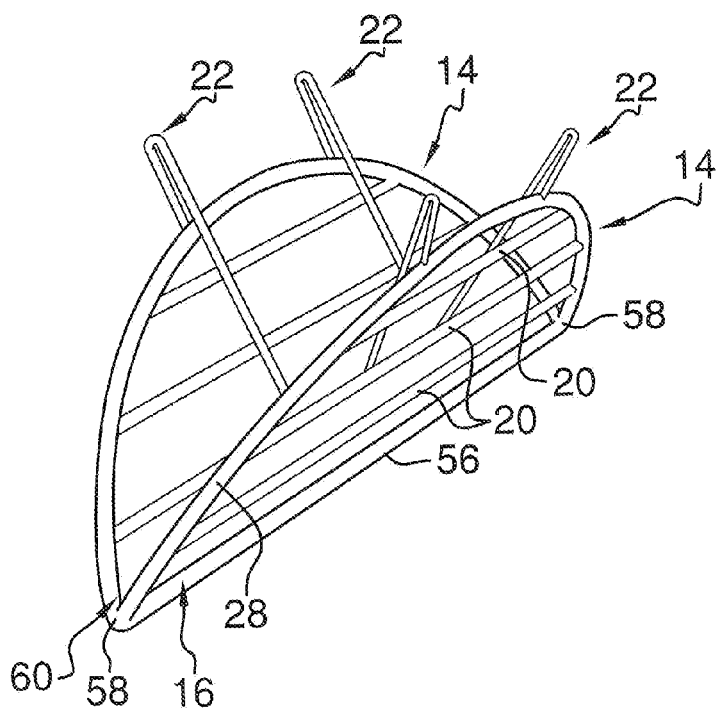
FIG. 5 is a top front side perspective view of an embodiment of the disclosure.
Figure 6:
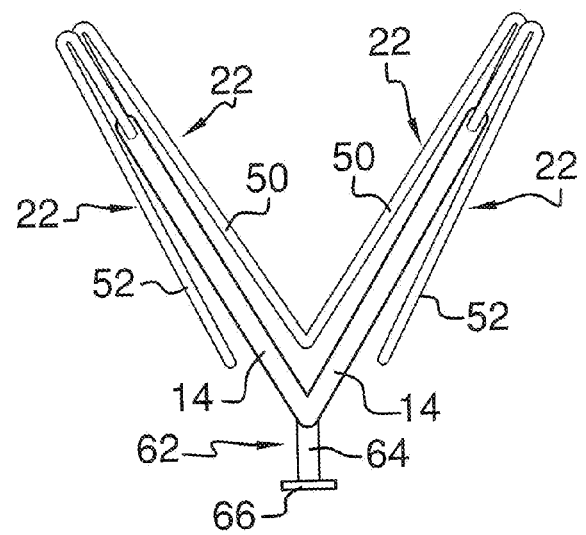
FIG. 6 is a front view of an embodiment of the disclosure.

The base 16 may be a single bar 56 coupled to and extending between opposite ends 58 of each of the lateral sides 14 of the frame 12 as shown in FIGS. 5 and 6. In this base configuration the lateral sides 14 of the frame 12 form an acute angle 60 extending between the lateral sides 14 of the frame 12. A stand 62 may be coupled to and extend from the base 16. The stand 62 may have a connection portion 64 and a planar foot 66 coupled to the connection portion 64.

In use, the tortilla is inserted into the frame 12 such that the holders 24 support the tortilla in a position conforming to the shape of the frame 12. The frame 12 is then inserted into heated oil to fry the tortilla into a taco shell. The device 10 supports the tortilla allowing sequential frying of each side of the taco shell without having to hold or support the tortilla in the desired shape by hand.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tortilla molding device comprising:
   a frame having a pair of lateral sides and a base coupled to and extending between said lateral sides, said base being planar; and
   a plurality of holders coupled to said frame, each of said holders having a first end coupled to said frame, each said holder having a medial portion positioned in spaced relationship to said lateral sides of said frame wherein said holders are configured to hold a tortilla in a partially open folded position adjacent to said frame permitting hands free frying of the tortilla in a pan of oil; and
   a pair of parallel spaced bars coupled to said base, each of bars having a fixed end coupled to said base, a free end, and a middle section extending between said fixed end of said bar and said free end in substantially parallel spaced relationship to said base.

2. The device of claim 1, further comprising each of said holders extending from an edge of an associated one of said lateral sides of said frame.

3. A tortilla molding device comprising:
   a frame having a pair of lateral sides and a base coupled to and extending between said lateral sides; and
   a plurality of holders coupled to said frame, each of said holders having a first end coupled to said frame, each said holder having a medial portion positioned in spaced relationship to said lateral sides of said frame wherein said holders are configured to hold a tortilla in a partially open folded position adjacent to said frame permitting hands free frying of the tortilla in a pan of oil, each of said holders extending from an edge of an associated one of said lateral sides of said frame, each of said holders having a first straight section, a second straight section and a medial section extending between said first straight section and said second straight section.

4. The device of claim 3, further comprising said first straight section of each said holder being coplanar with said associated lateral side of said frame.

5. The device of claim 3, further comprising said medial section of each said holder being arcuate.

6. The device of claim 3, further comprising said second straight section of each said holder being positioned in substantially parallel spaced relationship to said first straight section of said holder.

7. The device of claim 3, further comprising said base being planar.

8. The device of claim 3, further comprising said second straight section of each said holder being positioned in spaced relationship to an interior face of said associated lateral side of said frame.

9. The device of claim 3, further comprising said second straight section of each said holder being positioned in spaced relationship to an exterior face of said associated lateral side of said frame.

10. The device of claim 3, further comprising
    said first straight section of each said holder being coplanar with said associated lateral side of said frame, said medial section of each said holder being arcuate, said second straight section of each said holder being positioned in substantially parallel spaced relationship to said first straight section of said holder.

11. The device of claim 10, further comprising said second straight section of each said holder being positioned in spaced relationship to an interior face of said associated lateral side of said frame.

12. The device of claim 10, further comprising said second straight section of each said holder being positioned in spaced relationship to an exterior face of said associated lateral side of said frame.

13. The device of claim 10, further comprising:
    said base being planar; and
    a pair of parallel spaced bars coupled to said base, each of bars having a fixed end coupled to said base, a free end, and a middle section extending between said fixed end of said bar and said free end in substantially parallel spaced relationship to said base.

14. The device of claim 10, further comprising:
    said plurality of holders including a plurality of interior holders and a plurality of exterior holders, said second straight section each said interior holder being positioned in spaced relationship to an interior face of said associated lateral side of said frame, said second straight section each said exterior holder being positioned in spaced relationship to an exterior face of said associated lateral side of said frame;
    said base being a single bar coupled to and extending between opposite ends of each of said lateral sides of said frame, said lateral sides of said frame forming an acute angle extending between said lateral sides of said frame; and
    a stand coupled to and extending from said base.

15. A tortilla molding device comprising:
    a frame having a pair of lateral sides and a base coupled to and extending between said lateral sides, said base being a single bar coupled to and extending between opposite ends of each of said lateral sides of said frame, said lateral sides of said frame forming an acute angle extending between said lateral sides of said frame; and
    a plurality of holders coupled to said frame, each of said holders having a first end coupled to said frame, each said holder having a medial portion positioned in spaced relationship to said lateral sides of said frame wherein said holders are configured to hold a tortilla in a partially open folded position adjacent to said frame permitting hands free frying of the tortilla in a pan of oil.

16. The device of claim 15, further comprising a stand coupled to and extending from said base.

17. The device of claim 15, further comprising:
    each of said holders extending from an edge of an associated one of said lateral sides of said frame;
    each of said holders having a first straight section, a second straight section and a medial section extending between said first straight section and said second straight section;
    said plurality of holders including a plurality of interior holders and a plurality of exterior holders, said second straight section each said interior holder being positioned in spaced relationship to an interior face of said associated lateral side of said frame, said second straight section each said exterior holder being positioned in spaced relationship to an exterior face of said associated lateral side of said frame.

* * * * *